July 3, 1923.
N. J. RYAN
1,460,984
INDICATOR FOR CAR SEATS
Filed Aug. 25, 1922
2 Sheets-Sheet 1
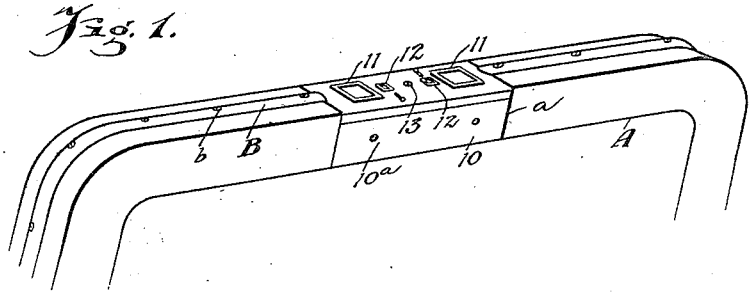
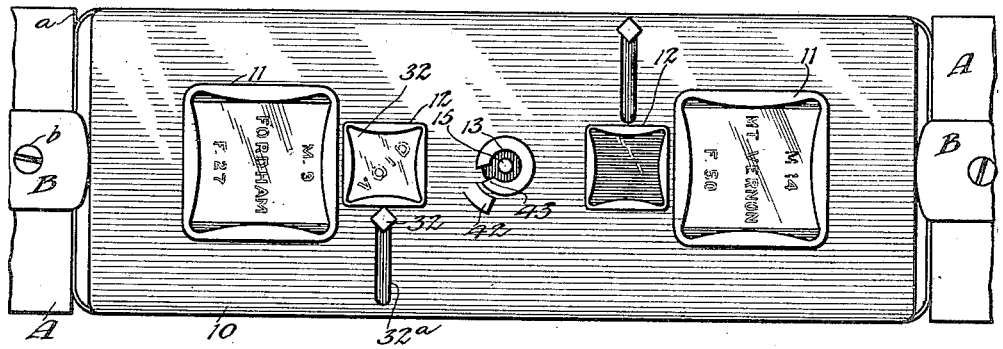
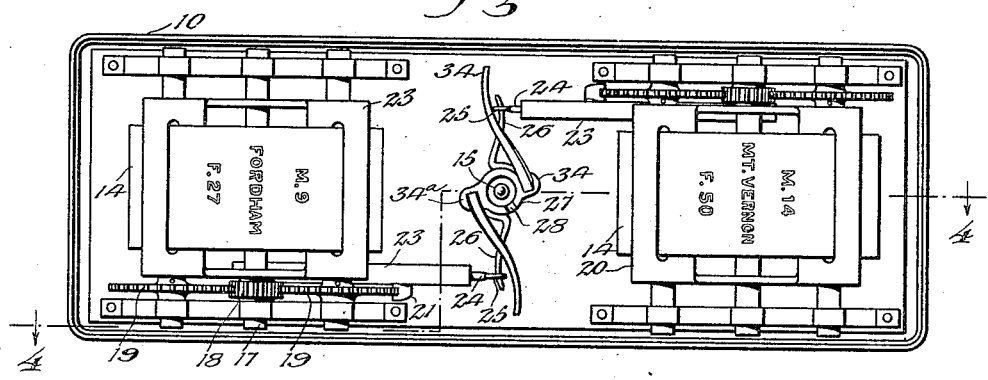
WITNESSES
INVENTOR
Nicholas J. Ryan
BY
ATTORNEYS July 3, 1923.
N. J. RYAN
1,460,984
INDICATOR FOR CAR SEATS
Filed Aug. 25, 1922
2 Sheets-Sheet 2
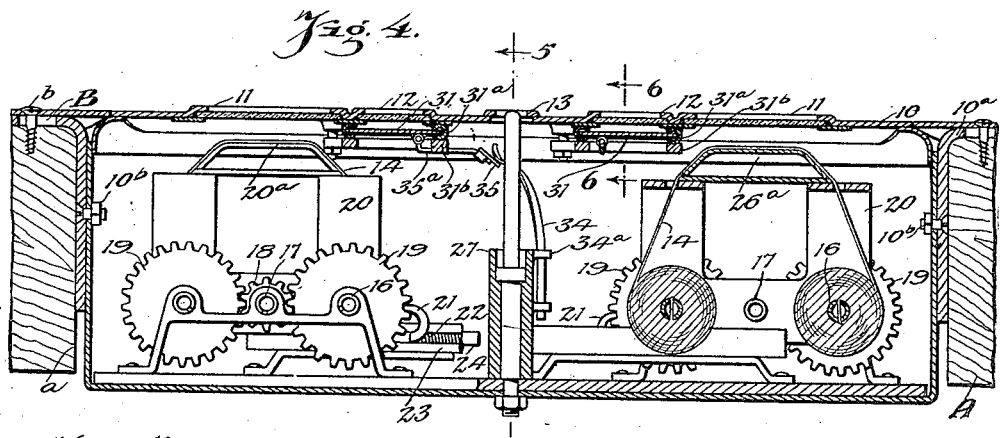
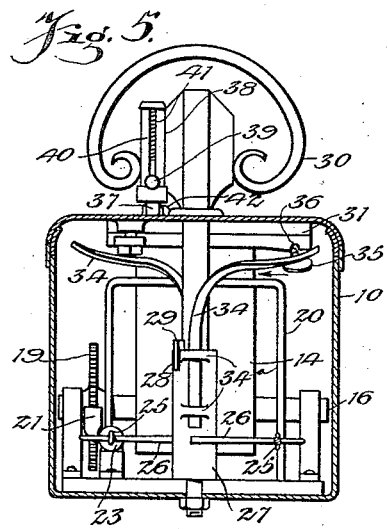
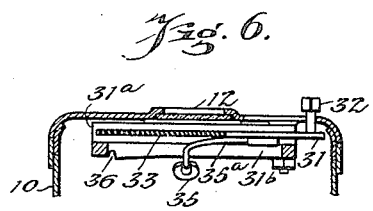
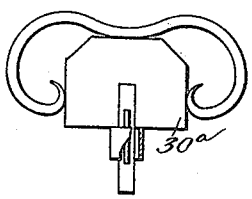
WITNESSES
INVENTOR
Nicholas J. Ryan
BY
ATTORNEYS Patented July 3, 1923.

1,460,984

UNITED STATES PATENT OFFICE.

NICHOLAS J. RYAN, OF TUCKAHOE, NEW YORK.

INDICATOR FOR CAR SEATS.

Application filed August 25, 1922. Serial No. 584,299.

*To all whom it may concern:*

Be it known that I, NICHOLAS J. RYAN, a citizen of the United States, and a resident of Tuckahoe, in the county of Westchester and State of New York, have invented a new and Improved Indicator for Car Seats, of which the following is a description.

My invention relates to an indicating means to be associated with passenger car seats more particularly on trains engaged in suburban traffic, with a view to circumvent dishonest passengers purchasing tickets entitling them to travel a comparatively short distance and then attempting to ride to destinations materially beyond the stations to which the tickets have been purchased, it being well known that the practice referred to results in great losses to the railroads and entails a trying task on the conductor.

The invention is more particularly intended as an improvement on the indicating means forming the subject-matter of United States Patent No. 1,371,816 granted to me March 15, 1921.

The general object of the present invention is to provide an indicating means improved in various particulars looking to attaining simplicity and durability of construction as well as promoting facility in the production, assembling and adjusting of the parts.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a top of a car seat equipped with my indicating means, the view showing one mode of emplacing the indicating means;

Figure 2 is an enlarged plan view of the indicating means and the adjacent portions of the car seat;

Figure 3 is a plan view with the casing cover removed;

Figure 4 is a partly sectional side elevation, the section being indicated by the line 4—4, Figure 3;

Figure 5 is a transverse vertical section indicated by the line 5—5, Figure 4;

Figure 6 is a detail in transverse vertical section as indicated by the line 6—6, Figure 4;

Figure 7 is a partly sectional side elevation given to show the key.

In carrying out my invention in accordance with the illustrated example a suitable casing 10 is provided preferably rectangular in cross section and equipped with suitable means for securing it in position on a car seat, the illustrated example showing the casing in a cut-out $a$ in the top of the seat and overlapped by central binding strips B on the car seat, the strips being indicated as secured by screws $b$.

The casing cover has windows 11 for viewing names of the stations or other information such as the distance in miles of the station from the terminal and the fare, for example, the display matter being produced on webs 14 as in my patent above referred to. In addition to the windows 11 smaller windows 12 appear adapted to display legends when the seat privileges are voided by changing of seats of the passenger entitled to ride to the indicated station. Central of the top is a key hole 13 in line with which within the casing is a vertical post or spindle 15 for receiving the tubular shank of a key hereinafter referred to.

The mechanism includes two web controlling assemblages and as both are alike it will answer to describe only one. The web is adapted to wind to or from reel shafts 16 between which is a tubular shaft 17 on which is a pinion 18 meshing with pinions 19 on the shafts 16. The web runs over a table 20ª on framework 20 within the casing, said tables being beneath the windows 11.

A dog 21 is adapted to engage one of the pinions 19 and is slidable in a guideway 23 having a spring 22 tending to engage the pawl. Key-operated means controls the pawl, the spring associated with a slidable member 24 telescoping in the guideway 23 and formed with an eye 25 in form shown which loosely receives the end of an operating arm 26 secured to a sleeve 27 on the post 15. Said sleeve 27 has a vertical slot 28 in the upper end to receive the bit 29 on a key 30 insertable through the hole 13 onto the spindle 15, so that the turning of the key will through the engagement of the bit 29 in slot 28 turn the sleeve 27 and thereby through the elements 26, 25, 24 carry the pawl 21 out of engagement with the pinion 19 permitting the reel shafts 16 to be turned through the medium of the pinions 18, 19. The shaft 17 is turned by a key $30^a$. The case 13 has key holes $10^a$ in the sides thereof alining with the shafts 17 for the entrance of the key $30^a$.

Beneath the windows 12 are slides 31 bearing a legend such as "void" to indicate that a seat with the traveling privileges pertaining to the seat have been voided by the occupant of the seat changing to another. The slide is adapted to be reciprocated in slotted guides $31^a$ forming part of the structure 31 of a support $31^b$ disposed on the cover of the casing beneath each window 12. The slide 31 is manually movable by a headed post 32 or equivalent means slidable in a slot $32^a$ in the top of the casing 10 so that when a passenger changes his seat he may move the slide to the window 12. Springs 33 in the slotted guides 13 tend to restore the slides 31 when permitted to do so.

A latch 35 is provided on each slide 31 and formed with resilient shanks $35^a$ normally tending to engage in a notch 36 in the support $31^b$. The latches are adapted to be released by cam fingers 34 provided on the sleeve 27 so that said fingers will engage and press downwardly on the latches 35 with the turning of the said sleeve 27 by the key 30.

In order to hold the pawls 21 in released position the key 30 as shown best in Figure 5 has a vertical latch bolt 37 slidable in an upright tube 38 on the key 30. Said bolt has an operating knob 39 slidable in a slot 40 of the tube 38 and a coil spring 41 in said tube above the bolt tends to throw said bolt 37 downwardly. On the top of the cover of the casing 10 adjacent to the key hole 13 is a cam projection 42 and the bolt 37 is adapted to ride over said projection 42 when the key 30 is turned to release the pawls 21, said bolt dropping behind said projection under the force of the spring 41 and thereby preventing the key from turning backward under the pressure of the springs 22. Thus, the pawls will be held out of engagement until the conductor withdraws the key from the hole 13.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. An indicator for car seats including a casing, a display web, said casing having a window for the viewing of said web, and having a second window, winding means for the web including a pinion, a pawl engageable with said pinion, a legend bearing slide movable to or from said second window, latch means to hold said slide at the window, a spring tending to move the slide away from the second window, a turnable key-operated element, and means on said element to release said pawl and said latch means.

2. In an indicator for car seats, means to display the station to which an occupant of the seat is privileged to travel, a slide adapted to bear a legend affecting the seat privilege, latch means to hold said slide with its legend displayed, a spring tending to move said slide away from display position, a turnable key-operated element, and means on said element to release said latch means.

3. An indicator for car seats including a casing, a display web, said casing having a window for the viewing of said web, and having a second window, winding means for the web including a pinion, a pawl engageable with said pinion, a legend bearing slide movable to or from said second window, latch means to hold said slide at the window, a spring tending to move the slide away from the second window, a turnable key-operated element, and means on said element to release said pawl and said latch means; together with a key for said turnable element, and co-engaging elements on the casing and on said key to hold the key in position after a releasing movement thereof.

4. In an indicator for car seats, a casing having a window, a slide within said casing and movable to or from said window, said slide adapted to bear a legend affecting the privileges attaching to said seat, a supporting structure at said window in which said slide has guided movement, a latch having a resilient shank, said structure having a notch adapted to be entered by said shank for holding the slide at the window, a spring tending to move the slide away from the window, and key-operated means to release said latch.

NICHOLAS J. RYAN.